United States Patent
Sahni et al.

(10) Patent No.: US 12,020,146 B2
(45) Date of Patent: Jun. 25, 2024

(54) ELECTRONIC DEVICE AND OPERATING METHOD THEREOF OF PROCESSING NEURAL NETWORK MODEL BY USING PLURALITY OF PROCESSORS

(71) Applicant: SAMSUNG ELECTRONICS CO., LTD., Suwon-si (KR)

(72) Inventors: Manas Sahni, New Delhi (IN); Arun Abraham, Thiruvananthapuram (IN); Sharan Kumar Allur, Bangalore (IN); Venkappa Mala, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1037 days.

(21) Appl. No.: 16/549,602

(22) Filed: Aug. 23, 2019

(65) Prior Publication Data

US 2020/0065671 A1 Feb. 27, 2020

(30) Foreign Application Priority Data

Aug. 23, 2018 (IN) .............................. 201841031660
Aug. 20, 2019 (IN) .............................. 201841031660
Aug. 23, 2019 (KR) ........................ 10-2019-0103878

(51) Int. Cl.
*G06N 3/08* (2023.01)
*G06N 3/098* (2023.01)
*G06N 5/04* (2023.01)
*G06N 5/043* (2023.01)

(52) U.S. Cl.
CPC ............... *G06N 3/08* (2013.01); *G06N 3/098* (2023.01); *G06N 5/043* (2013.01)

(58) Field of Classification Search
CPC .............................. G06N 3/098; G06N 5/043
See application file for complete search history.

(56) References Cited

U.S. PATENT DOCUMENTS

| | | | |
|---|---|---|---|
| 2003/0023569 A1 | 1/2003 | De Tremiolles et al. | |
| 2004/0083139 A1* | 4/2004 | Borri | G11B 27/034 |
| | | | 705/26.81 |
| 2007/0211064 A1 | 9/2007 | Buck et al. | |

(Continued)

FOREIGN PATENT DOCUMENTS

| | | |
|---|---|---|
| CN | 106471526 A | 3/2017 |
| CN | 107748915 A | 3/2018 |

(Continued)

OTHER PUBLICATIONS

Pipe Dream: Fast and Efficient Pipeline Parallel DNN Training, Aaron Harlap, Jun. 8, 2018, arxiv.org.*

(Continued)

*Primary Examiner* — Hal Schnee
(74) *Attorney, Agent, or Firm* — Sughrue Mion, PLLC

(57) ABSTRACT

A method of processing a neural network model by using a plurality of processors includes allocating at least one slice to each layer from among a plurality of layers included in the neural network model, allocating each layer from among the plurality of layers to the plurality of processors based on respective processing times of the plurality of processors for processing each of the at least one slice, and processing the neural network model by using the plurality of processors based on a result of the allocation.

22 Claims, 12 Drawing Sheets

(56) References Cited

U.S. PATENT DOCUMENTS

| | | | |
|---|---|---|---|
| 2008/0016014 | A1 | 1/2008 | Sigal et al. |
| 2011/0029471 | A1 | 2/2011 | Chakradhar et al. |
| 2017/0024849 | A1 | 1/2017 | Liu et al. |
| 2018/0032846 | A1 | 2/2018 | Yang et al. |
| 2018/0088996 | A1 | 3/2018 | Rossi et al. |
| 2018/0137396 | A1 | 5/2018 | Szegedy et al. |
| 2018/0285715 | A1 | 10/2018 | Son et al. |
| 2018/0293493 | A1* | 10/2018 | Kalamkar ............ G06T 1/20 |
| 2018/0300616 | A1 | 10/2018 | Ambardekar et al. |

FOREIGN PATENT DOCUMENTS

| | | |
|---|---|---|
| CN | 107909016 A | 4/2018 |
| WO | 2018022821 A1 | 2/2018 |

OTHER PUBLICATIONS

TVM: An Automated End-to-End Optimizing Compiler for Deep Learning, Tianqi Chen, Oct. 10, 2018.*

Mao, Jiachen, et al. "Modnn: Local distributed mobile computing system for deep neural network." Design, Automation & Test in Europe Conference & Exhibition (DATE), 2017. IEEE, 2017. (Year: 2017).*

Pethick, Mark, et al. "Parallelization of a backpropagation neural network on a cluster computer." International conference on parallel and distributed computing and systems (PDCS 2003). 2003. (Year: 2003).*

Seiffert, Udo. "Artificial neural networks on massively parallel computer hardware." Neurocomputing 57 (2004): 135-150. (Year: 2004).*

Chen, Chi-Chung, Chia-Lin Yang, and Hsiang-Yun Cheng. "Efficient and robust parallel dnn training through model parallelism on multi-gpu platform." arXiv preprint arXiv:1809.02839 (2018). (Year: 2018).*

Communication dated Feb. 10, 2022, issued by the European Patent Office in counterpart European Application No. 19851438.2.

Kang et al., "Neurosurgeon: Collaborative Intelligence Between the Cloud and Mobile Edge," Architectural Support for Programming Languages and Operating Systems, vol. 45, No. 1, Apr. 4, 2017, pp. 615-629, XP055884984.

Lane et al., "DeepX: A Software Accelerator for Low-Power Deep Learning Inference on Mobile Devices," 2016 15th ACM/IEEE International Conference on Information Processing in Sensor Networks (IPSN), IEEE, Apr. 11, 2016, pp. 1-12, XP032896064.

Abadi et al., "TensorFlow: Large-Scale Machine Learning on Heterogeneous Distributed Systems," Nov. 9, 2015, pp. 1-19, XP055498936.

Kaufmann et al., "The HCl Scheduler: Going all-in on Heterogeneity," 9th USENIX Workshop on Hot Topics in Cloud Computing, HOTCLOUD'17, Jul. 10, 2017, Total 7 pages, XP055885686.

Rhu et al., "vDNN: Virtualized Deep Neural Networks for Scalable, Memory-Efficient Neural Network Design," 2016 49th Annual IEEE/ACM International Symposium On Microarchitecture (MICRO), IEEE, Oct. 15, 2016, pp. 1-13, XP033022464.

Laich, "Graph Partitioning and Scheduling for Distributed Dataflow Computation," University of Stuttgart, Institute of Parallel and Distributed Systems, Sep. 14, 2016, pp. 1-71, XP055465499.

Pienaar et al., "Automatic Generation of Software Pipelines for Heterogeneous Parallel Systems," High Performance Computing, Networking, Storage and Analysis (SC), 2012 International Conference For, IEEE, Nov. 10, 2012, pp. 1-12, XP032337481.

Shin et al., "Deep Convolutional Neural Networks for Computer-Aided Detection: CNN Architectures, Dataset Characteristics and Transfer Learning", 2016, IEEE Transactions on Medical Imaging, vol. 35, No. 5, 14 pages total.

Communication dated Feb. 5, 2021 by the Indian Patent Office in Indian Patent Application No. 201841031660.

International Search Report and Written Opinion (PCT/ISA/210 and PCT/ISA/237), dated Dec. 4, 2019 by International Searching Authority in International Application No. PCT/KR2019/010773.

Communication dated Sep. 21, 2023, issued by the European Patent Office in European Application No. 19851438.2.

Communication dated Apr. 9, 2024, issued by the China National Intellectual Property Administration in Chinese Application No. 201980054129.1.

\* cited by examiner

ELECTRONIC DEVICE AND OPERATING METHOD THEREOF OF PROCESSING NEURAL NETWORK MODEL BY USING PLURALITY OF PROCESSORS

CROSS-REFERENCE TO RELATED APPLICATIONS

This application is based on and claims priority under 35 U.S.C. § 119 to Korean Patent Application No. 10-2019-0103878, filed on Aug. 23, 2019, in the Korean Intellectual Property Office, and Indian Patent Application Nos. 201841031660, filed on Aug. 20, 2019, and 201841031660, filed on Aug. 23, 2018, in the Indian Patent Office, the disclosures of which are herein incorporated by reference in their entireties.

BACKGROUND

1. Field

The disclosure relates to an electronic device for processing a neural network model using a plurality of processors and a method of operating the same.

2. Description of Related Art

An electronic device may perform face recognition, voice recognition, image processing, etc. using a deep learning technology based on a neural network model and provide results thereof as output.

The electronic device may process a neural network model by using a plurality of processors, e.g., a central processing unit (CPU), a graphics processing unit (GPU), a neural processing unit (NPU), a digital signal processor (DSP), etc. The electronic device may process a neural network model by using a plurality of processors by assigning a plurality of layers constituting the neural network model to the plurality of processors.

However, processing speed and accuracy may vary depending on the performance of each processor and the characteristics of each layer. Therefore, a method of allocating layers of a neural network model to be processed by each processor based on the processing capability of the plurality of processors and the characteristics of the layers is demanded.

SUMMARY

The disclosure provides an electronic device for processing a neural network model by using a plurality of processors and a method of operating the electronic device.

The disclosure also provides computer-readable recording medium having recorded thereon a program for executing the method on a computer. The technical problems to be solved are not limited to the above technical problems, and other technical problems may exist.

Additional aspects will be set forth in part in the description which follows and, in part, will be apparent from the description, or may be learned by practice of the presented embodiments of the disclosure.

According to a first aspect of the disclosure, there is provided a method of processing a neural network model by using a plurality of processors, including allocating at least one slice to each layer from among a plurality of layers included in the neural network model; allocating each layer from among the plurality of layers to a processor from among the plurality of processors based on respective processing times of the plurality of processors for processing the at least one slice allocated to each layer; and processing the neural network model by using the plurality of processors based on a result of the allocating, wherein the processing times comprise a switching time elapsed for each processor from among the plurality of processors to receive data for processing a current slice from a previous processor from among the plurality of processors processing a previous slice.

According to a second aspect of the disclosure, there is provided an electronic device for processing a neural network model, including a memory configured to store the neural network model and at least one processor configured to allocate at least one slice to each layer from among a plurality of layers included in the neural network model, allocate each layer from among the plurality of layers to a processor from among a plurality of processors based on respective processing times of the plurality of processors for processing the at least one slice allocated to each layer, process the neural network model based on a result of the allocation, and output a result of processing the neural network model, wherein the processing times comprises a switching time elapsed for each processor from among the plurality of processors to receive data for processing a current slice from a previous processor from among the plurality of processors processing a previous slice.

According to another aspect of the disclosure, there is provided a computer-readable recording medium having recorded thereon a program for implementing the method of the first aspect.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
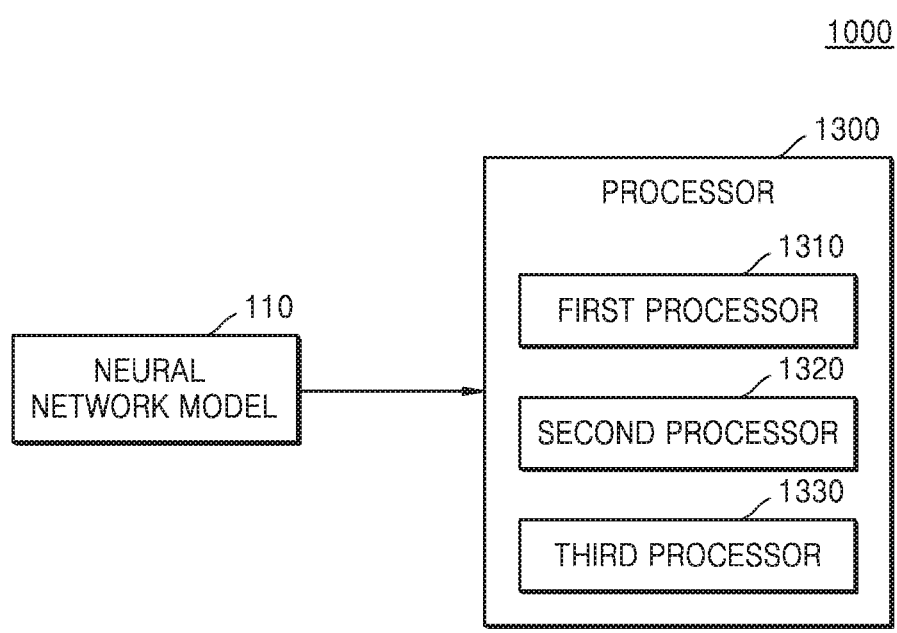
FIG. 1 is a diagram showing an example of processing a neural network model in an electronic device according to an embodiment.

Hereinafter, embodiments of the disclosure will be described in detail with reference to the accompanying drawings so that those skilled in the art may easily implement the disclosure. The disclosure may, however, be embodied in many different forms and should not be construed as limited to the embodiments set forth herein. In order to clearly illustrate the disclosure, parts not related to the description are omitted, and like parts are denoted by like reference numerals throughout the specification.

Throughout the disclosure, the expression "at least one of a, b or c" indicates only a, only b, only c, both a and b, both a and c, both b and c, all of a, b, and c, or variations thereof.

Throughout the specification, when a part is "connected" to another part, this includes not only "directly connected" but also "electrically connected" with another element in between. In addition, unless explicitly described to the contrary, the word "comprise" and variations such as "comprises" or "comprising" will be understood to imply the inclusion of stated elements but not the exclusion of any other elements.

Artificial intelligence-related functions according to the disclosure are operated through a processor and a memory. A processor may include one or a plurality of processors. In this case, the one or the plurality of processors may each be a general purpose processor, such as a CPU, an AP, and a digital signal processor (DSP), a graphics dedicated processor, such as a GPU and a vision processing unit (VPU), or an artificial intelligence dedicated processor, such as an NPU. The one or the plurality of processors control to process input data according to a predefined operation rule or an AI model stored in a memory. Alternatively, when the one or the plurality of processors are artificial intelligence dedicated processors, the artificial intelligence dedicated processors may be designed to have a hardware structure specialized for processing a specific AI model.

The predefined operation rule or the AI model may be constructed through learning. Here, construction through learning means that, as a basic AI model is trained by using a plurality of pieces of learning data according to a learning algorithm, a predefined operation rule or an AI model that is set to perform a desired characteristic (or purpose) is constructed. Such learning may be performed in a device in which an AI according to the disclosure is executed or may be performed through a separate server and/or a system. Examples of learning algorithms include supervised learning, unsupervised learning, semi-supervised learning, or reinforcement learning, but are not limited to the above examples.

An AI model may include a plurality of neural network layers. Each of the plurality of neural network layers has a plurality of weight values, and a neural network operation is performed through operations between an operation result of the previous layer and the plurality of weight values. The weight values of the neural network layers may be optimized through learning results of the AI model. For example, the plurality of weight values may be renewed such that a loss value or a cost value obtained by an AI model during a learning process is reduced or minimized. Artificial neural networks may include a deep neural network (DNN) and may include, for example, a convolutional neural network (CNN), a recurrent neural network (RNN), a restricted Boltzmann machine (RBM), a deep belief network (DBN), a bidirectional recurrent deep neural network (BRDNN), and a deep Q-networks, but are not limited to the above examples.

Hereinafter, the disclosure will be described in detail with reference to the accompanying drawings.

FIG. 1 is a diagram showing an example of processing a neural network model 110 in an electronic device 1000 according to an embodiment.

Referring to FIG. 1, the electronic device 1000 may process the neural network model 110 by using a processor 1300 including a plurality of processors 1310, 1320, and 1330.

According to an embodiment, the electronic device 1000 may process the neural network model 110 by using a plurality of processors through a compiling operation and a task performing operation. For example, the electronic device 1000 may perform a compiling operation for allocating tasks to be performed by a plurality of processors and a task performing operation for performing tasks using the plurality of processors according to a result of the allocation in the compiling operation. The compiling operation according to an embodiment may be performed by at least one of the plurality of processors.

According to an embodiment, the compiling operation may include an operation for allocating a memory for storing data used to perform tasks, as well as an operation for allocating tasks to be performed by the plurality of processors.

The electronic device 1000 according to an embodiment may be implemented in various forms. For example, the electronic device 1000 described herein may include a digital camera, a smart phone, a laptop computer, a tablet PC, an e-book terminal, a digital broadcasting terminal, a personal digital assistant (PDA), portable multimedia player (PMP), a navigation device, and an MP3 player, but is not limited thereto. The electronic device 1000 described herein may be a wearable device that may be worn by a user. A wearable devices may be include at least one of an accessory-type device (e.g., a wristwatch, a ring, a wristband, an ankle band, a necklace, an eyeglass, a contact lens, etc.), a head-mounted-device (HMD), a textile or apparel integrated device (e.g., an electronic clothing), a body-attachable device (e.g., a skin pad), and a bio-implantable device (e.g., an implantable circuit), but is not limited thereto. Hereinafter, for convenience of explanation, a case where the electronic device 1000 is a smart phone will be described as an example.

The electronic device 1000 according to an embodiment may perform various operations using the neural network model 110. For example, the neural network model 110 may include an AI model, such as a deep neural network (DNN), a recurrent neural network (RNN), and a convolutional neural network (CNN). In addition to the above-described examples, the neural network model 110 according to an embodiment may include various types of AI models.

According to an embodiment, the electronic device 1000 may perform various operations, such as recognizing data or generating new data, by using at least one neural network model 110 and provide a result thereof to a user.

The neural network model 110 according to an embodiment may include a plurality of layers. Each layer included in the neural network model 110 may include at least one function for processing data. For example, the neural network model 110 including a CNN model may include a combination of various types of layers, such as a convolution layer, a max pooling layer, and a flatten layer.

For example, in the convolution layer, an operation for extracting feature information about input data may be performed. In the max pooling layer, an operation for extracting main data from the input data may be performed. In the flatten layer, an operation for converting values of input data into 1-dimensional values may be performed. In addition to the above-described examples, the neural network model 110 may include various types of layers.

The electronic device 1000 according to an embodiment may include the plurality of processors 1310, 1320, and 1330. For example, the electronic device 1000 may include various types of processors, such as a CPU, a GPU, an NPU, and a DSP. Processors may have different performances and features from one another. For example, a CPU is slower than other processors, but exhibits higher accuracy and excellent energy efficiency.

Table 1 below shows the relative characteristics of the CPU, the GPU, the NPU, and the DSP.

TABLE 1

|  | CPU | GPU | DSP | NPU |
| --- | --- | --- | --- | --- |
| Speed | Slow | Fast | Very Fast | Very Fast |
| Accuracy | Robust | Robust | Sensitive | Sensitive |
| Energy Efficiency | Good | Bad | Very Good | Very Good |
| Ease of Performing New Tasks | Easy | Somewhat Difficult | Very Difficult | Impossible |
| Code Check | Easy | Somewhat Difficult | Very Difficult | Impossible |

The characteristics of the processors described in Table 1 are merely examples and may vary according to various factors, such as the characteristics of tasks performed by the respective processors or the current states of the processors.

According to an embodiment, in the compiling operation, one processor from among the processors 1310, 1320, and 1330 of the electronic device 1000 may be allocated to certain layers included in the neural network model 110. In the electronic device 1000, based on the performance of each processor 1310, 1320, and 1330 as shown in Table 1 and the characteristics of each layer included in the neural network model 110, a processor may be allocated to each layer.

According to an embodiment, the speed and the accuracy of processors for processing layers may be different from one another according to the characteristics of the layers. The electronic device 1000 according to an embodiment may allocate a processor from among a plurality of processors to process each layer among the various layers by determining which of processors is suitable for processing each layer of the neural network model 110.

According to an embodiment, when processors to process layers are allocated, the electronic device 1000 may process the neural network model 110 by using a plurality of processors according to a result of the allocation.

Figure 2:
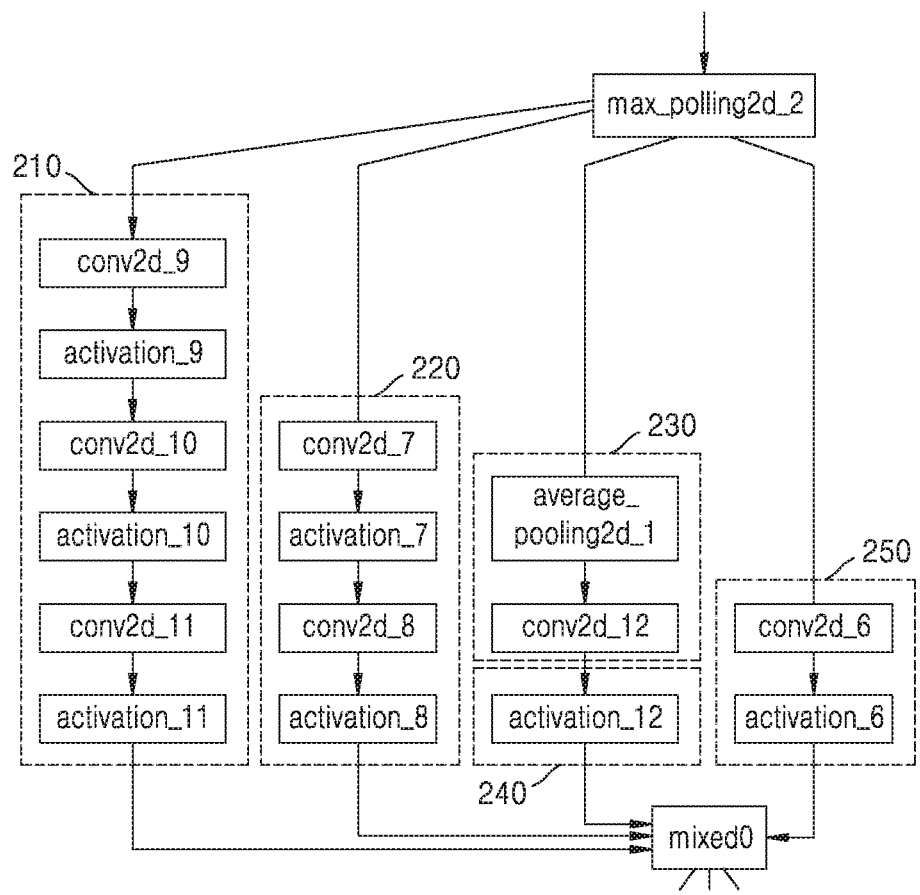
FIG. 2 is a diagram showing an example in which layers of the neural network model are allocated to at least one slice, according to an embodiment.

FIG. 2 is a diagram showing an example in which layers of the neural network model 110 are allocated to at least one slice, according to an embodiment.

Nodes shown in FIG. 2 represent some of layers constituting the neural network model 110. According to an embodiment, the neural network model 110 may be processed in the electronic device 1000 as a result of an operation performed in each layer is transmitted to a next layer in the direction indicated by the arrow.

According to an embodiment, a plurality of layers of the neural network model 110 may be allocated to at least one slice, and layers may be allocated to processors with a slice as a unit. According to an embodiment, the electronic device 1000 may allocate layers to processors with a slice including at least one layer as a unit instead of a layer as a unit, thereby reducing the amount of computation generated by an allocation operation.

According to an embodiment, the electronic device 1000 may determine at least one of a plurality of layers constituting the neural network model 110 as a slice point, thereby allocating the plurality of layers to slices. According to an embodiment, respective layers may be assigned to different slices based on a slice point.

For example, the electronic device 1000 may sequentially determine whether to determine each of layers "conv2d_9" to "activation_11" as a slice point. In addition, it may be sequentially determined whether each of layers "conv2d_7" to "activation_8" after the layer "activation_11" is a slice point. It may also be sequentially determined whether each of layers "average_pooling2d_1" to "activation_6" is a slice point.

According to an embodiment, the electronic device 1000 may determine a slice point based on at least one of whether each layer is a branching point of a plurality of layers, is a point where a plurality of layers are combined, includes tasks that may be processed by the same processor, and includes tasks that needs high accuracy. According to an embodiment, like as the various criteria described above, the current layer may be determined as a slice point based on whether it may be switched in the current layer to a processor different from the processor of the previous layer. In addition to the above-described example, the slice point may be determined according to various criteria.

For example, since "conv2d_9" is one of a plurality of layers branched from "max_pooling2d_2", it may be determined as a slice point as it corresponds to a branching point of a plurality of layers. Therefore, "conv2d_9" may belong to a new slice 1 210.

Layers "activation_9" to "actionvation_11" are not determined as slice points according to the above-described criteria for determining a slice point, and thus the layers "activation_9" to "actionvation_11" may be allocated to the slice 210.

Since "conv2d_7" is one of a plurality of layers branched from "max_pooling2d_2" like "conv2d_9", "conv2d_7" may also determined as a slice point and may belong to a new slice 2 220. Layers "conv2d_7" to "actionvation_8" are not determined as slice points and may be allocated to the slice 2 220.

Since "average_pooling2d_1" is one of a plurality of layers branched from "max_pooling2d_2" like "conv2d_9", "average_pooling2d_1" is determined as a slice point and may belong to a new slice 3 230. A layer "conv2d_12" is not determined to be a slice point and may be assigned to the slice 3 230.

A layer "activation_12" may be determined as a slice point as it does not include a task that may be processed by the same processor as the layers of the slice 3 230 or includes a task needing high accuracy and may belong to a new slice 4 240.

For example, when none of processors capable of processing "activation_12" is capable of processing layers "activation_12" and "conv2d_12", which are layers included in the slice 3 230, processors allocated to the slice 3 230 are not able to process "activation_12", and thus "activation_12" may not belong to the slice 3 230. According to an embodiment, as processors are allocated to slices, layers belonging to the same slice may be processed by the same processor.

In another example, even when "activation_12" includes a task needing high accuracy, "activation_12" may be determined as a slice point, such that a processor suitable for "activation_12" may be allocated without being affected by other layers.

Since "conv2d_6" is one of a plurality of layers branched from "max_pooling2d_2" like "conv2d_9", "conv2d_6" may also determined as a slice point and may belong to a new slice 5 250. A layer "activation_6" is not determined to be a slice point and may be assigned to the slice 5 250.

According to an embodiment, each slice may be allocated to one layer. According to an embodiment of the disclosure, the electronic device 1000 may determine a processor to process each slice, based on a processing time of each processor for each slice.

The processing time according to an embodiment may include a time elapsed for a current processor to process a task of at least one layer included in a current slice and a switching time elapsed for the current processor to receive data needed to process the current slice from another processor. For example, the data needed to process the current slice and received from the other processor may include data input to a layer included in the current slice. Also, the other processor may be a previous processor that processes a previous slice and outputs data input to the current slice.

According to an embodiment, the switching time may indicate a time elapsed for data regarding a result of processing a previous slice to be delivered to a current processor when a previous processor for processing the previous slice is different from the current processor for processing a current slice.

For example, when a first processor 1310 is allocated to the slice 3 230, the switching time of a second processor 1320 for the slice 4 240 may indicate a time elapsed for output data of "conv2d_12" is transmitted from the first processor 1310 to the second processor 1320. Also, the switching time of a third processor 1330 for the slice 4 240 may indicate a time elapsed for the output data of "conv2d_12" to be transmitted from the first processor 1310 to the third processor 1330. The switching time according to an embodiment may further include time elapsed for data to be transmitted from the first processor 1310 to the second processor 1320 and also time elapsed for converting the data into a data format of the second processor 1320. Also, the switching time according to an embodiment may increase as the size of data to be transmitted increases.

In addition, when a previous processor for processing a previous slice and a current processor for processing a current slice are the same, no data is transmitted between processors, and thus the switching time according to an embodiment may be determined as 0. For example, the switching time of the first processor 1310 for the slice 4 240 may be determined as 0, as the first processor 1310 is allocated to the slice 3 230.

Therefore, according to an embodiment, a processor for processing each slice may be determined based on the time elapsed for processing tasks of layers of each slice, and also the switching time for transmitting data between processors to process a plurality of slices through a plurality of processors.

Figure 3:
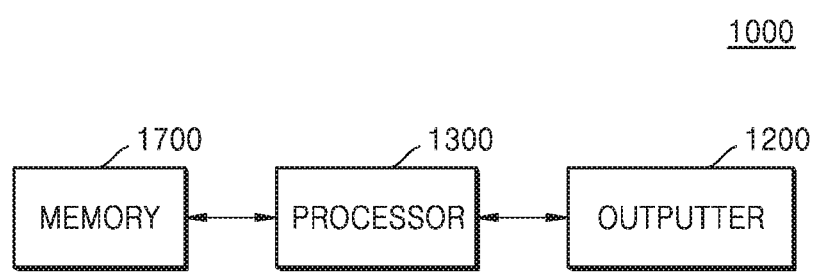
FIG. 3 is a block diagram for describing an internal configuration of the electronic device according to an embodiment.

FIG. 3 is a block diagram for describing an internal configuration of the electronic device 1000 according to an embodiment.

Figure 4:
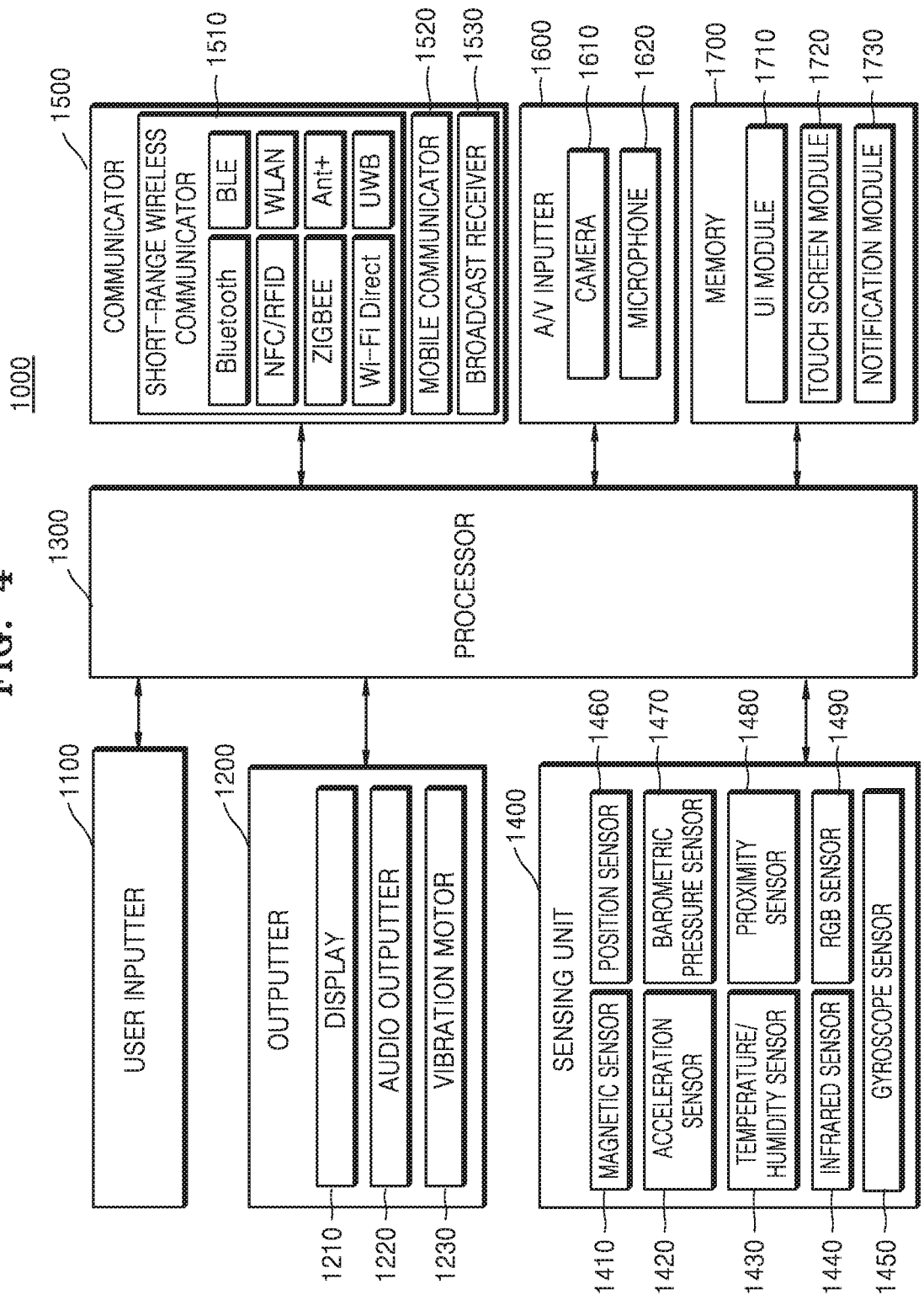
FIG. 4 is a block diagram for describing an internal configuration of the electronic device according to an embodiment.

FIG. 4 is a block diagram for describing an internal configuration of the electronic device 1000 according to an embodiment.

Referring to FIG. 3, the electronic device 1000 may include a processor 1300, a memory 1700, and an outputter 1200. However, the electronic device 1000 may be implemented by components other than those shown in FIG. 3.

For example, as shown in FIG. 4, in addition to the processor 1300, the memory 1700, and the outputter 1200, the electronic device 1000 according to some embodiments may further include a user inputter 1100, a sensing unit 1400, a communicator 1500, and an A/V inputter 1600.

The user inputter 1100 may denote a tool by which the user inputs data to control the electronic device 1000. For example, the user inputter 1100 may include a key pad, a dome switch, a touch pad (a contact type capacitive method, a pressure-type resistive method, an infrared ray detection method, an surface ultrasonic conductivity method, an integral equation type tension measurement method, a piezo-electric effect method, etc.), a jog wheel, a jog switch, etc.; however, the embodiment is not limited thereto.

According to an embodiment, the user inputter 1100 may receive a user input needed to perform an operation by the neural network model 110. According to an embodiment of the disclosure, the electronic device 1000 may process the neural network model 110 by using a plurality of processors and output a result thereof according to a user input received from the user inputter 1100.

The output unit 1200 may output an audio signal, a video signal or a vibration signal, and the output unit 1200 may include a display unit 1210, an audio output interface 1220, and a vibration motor 1230.

The display unit 1210 may display information processed in the electronic device 1000.

When the display unit 1210 and the touch pad make the touch screen in a layer structure, the display unit 1210 may be used as an input device in addition to an output device. The display unit 1210 may include at least one of a liquid crystal display, a thin film transistor-liquid crystal display, an organic light-emitting diode, a flexible display, a three-dimensional display, and an electrophoretic display. In addition, the electronic device 1000 may include two or more display units 1210 depending on a realization type of the electronic device 1000.

The audio output interface 1220 may output audio data that is received from the communicator 1500 or stored in the memory 1700.

The vibration motor 1230 may output the vibration signal. In addition, the vibration motor 1230 may output the vibration signal when a touch is inputted onto the touch screen.

According to an embodiment, a result that the neural network model 110 is processed by the processor 1300 may be output in various forms through the display 1210, the audio output interface 1220, and the vibration motor 1230.

The processor 1300 may control an overall operation of the electronic device 1000. For example, the processor 1300 may generally control the user inputter 1100, the output unit 1200, the sensing unit 1400, the communicator 1500, the A/V inputter 1600, etc. by executing programs stored in the memory 1700. The electronic device 1000 may include a plurality of processors.

The processor 1300 may be configured to process instructions of a computer program by performing basic arithmetic, logic, and input/output operations. An instruction may be provided from the memory 1700 to the processor 1300 or may be received through the communicator 1500 and provided to the processor 1300. For example, processor 1300 may be configured to execute instructions in accordance with program codes stored in a storage device, such as a memory.

The processor 1300 according to an embodiment may allocate a plurality of layers included in the neural network model 110 to at least one slice and allocate a processor to process each slice from among a plurality of processors included in the processor 1300. Also, based on a result of the allocation, the processor 1300 may process the neural network model 110.

According to an embodiment, a processor for each slice may be allocated based on the processing time of the processor for the slice. The processing time according to an embodiment may include a switching time elapsed for data transmission between processors.

According to an embodiment, the processor 1300 may identify at least one layer included in at least one slice allocated to a first processor from among a plurality of processors. Also, the processor 1300 may identify at least one blob each representing at least one piece of data input to the identified layer, data output from the identified layer, and data temporarily stored in the identified layer and allocate a memory to store data corresponding to the identified blob.

According to an embodiment, a memory for a current blob may be allocated by determining whether a period for using a previous blob is terminated before data of a current blob is generated according a sequence of processing layers. Also, the size of the allocated memory may be determined based on the largest data size from among data sizes of at least one blob to which the same memory is allocated.

The sensing unit 1400 may detect a status of the electronic device 1000 or an ambient status of the electronic device 1000, and transfer detected information to the processor 1300.

The sensing unit 1400 may include at least one of a geomagnetic sensor 1410, an acceleration sensor 1420, a temperature/humidity sensor 1430, an infrared ray sensor 1440, a gyroscope sensor 1450, a location sensor 1460 (for example, a global positioning system (GPS)), an atmospheric pressure sensor 1470, a near field sensor 1480, and a red-green-blue (RGB) sensor 1490 (illuminance sensor); however, the embodiment is not limited thereto.

According to an embodiment, information detected by the sensing unit 1400 may be used as input information of the neural network model 110 or may be used to renew the neural network model 110. In addition to the above-described example, the information detected by the sensing unit 1400 may be used according to various methods of processing the neural network model 110.

The communicator 1500 may include one or more components that enables the electronic device 1000 to communicate with a server 2000 or an external device. For example, the communicator 1500 may include a short-range wireless communication unit 1510, a mobile communicator 1520, and a broadcasting receiver 1530.

The short-range wireless communication unit 1510 may include a Bluetooth communication unit, a Bluetooth low energy (BLE) communication unit, a near field communication unit, a wireless local area network (WLAN) or Wi-Fi communication unit, a Zigbee communication unit, an infrared data association (IrDA) communication unit, a Wi-Fi Direct (WFD) communication unit, an ultra wideband (UWB) communication unit, an Ant+ communication unit, etc.; however, the embodiment is not limited thereto.

The mobile communication unit 1520 may transceive wireless signals to and from at least one of a base station, an external terminal, and a server on a mobile communication network. The wireless signals may include various types of data per transceiving audio call signals, video communication call signals or text/multimedia messages.

The broadcasting receiver 1530 may receive broadcasting signals and/or information related to broadcasting from the outside via broadcasting channels. The broadcasting channels may include satellite channels and ground wave channels. Depending on a type of realization, the electronic device 1000 may not include the broadcasting receiver 1530.

According to an embodiment, the communicator 1500 may transmit a result of processing the neural network model 110 to an external device. Alternatively, the communicator 1500 may receive information for processing the neural network model 110 from an external device.

The audio/video (A/V) inputter 1600 is to input audio signals or video signals, and may include a camera 1610, a microphone 1620, etc. The camera 1610 may acquire image frames such as stationary images or video images via an image sensor at a video call mode or a shooting mode. Images captured by the image sensor may be processed via the processor 1300 or a separate image processor. The microphone 1620 may receive an input of external audio signals and process the audio signals into electrical audio data.

According to an embodiment, image data or audio data obtained by the A/V inputter 1600 may be used as input information of the neural network model 110 or may be used to renew the neural network model 110. In addition to the above-described example, the image data or the audio data may be used according to various methods of processing the neural network model 110.

The memory 1700 may store programs for processing and controlling of the processor 1300, and store data also that is inputted into the electronic device 1000 or outputted from the electronic device 1000.

The memory 1700 according to an embodiment may store information about the neural network model 110 and information about performance of a plurality of processors. For example, the information about the performance of the plurality of processors may include information about processors processing speed for layers, information about layers that may be processed by each processor, and information about time elapsed for switching data between different processors. In addition to the above-described examples, the information about the performance of the plurality of processors may include various types of information for allocating slices to the plurality of processors.

The memory 1700 may include at least one type of storing media such as a flash memory, a hard disk, a multimedia micro-card, a card type memory (for example, secure digital (SD) or extreme digital (XD) memory), a random access memory (RAM), a static random access memory (SRAM), a read-only memory (ROM), an electrically erasable programmable read-only memory(EEPROM), a programmable read-only memory(PROM), a magnetic memory, a magnetic disk, and an optical disk.

Programs stored in the memory 1700 may be classified into a plurality of modules per function and may be, for example, a user interface (UI) module 1710, a touch screen module 1720, a notification module 1730, etc.

The UI module 1710 may provide specialized UI, graphic UI (GUI), etc., which are linked to the electronic device 1000 per application. The touch screen module 1720 may sense the user's touch gesture on the touch screen and transmit information about the touch gesture to the processor 1300. The touch screen module 1720 according to some embodiments may recognize and analyze a touch code. The touch screen module 1720 may be composed of separate hardware including the controller.

Various sensors may be arranged inside or near the touch screen for detecting the touch on the touch screen or a close touch. A tactile sensor is an example of a sensor for detecting the touch on the touch screen. The tactile sensor may sense the touch of a particular object at a level of human feeling or at a higher level than that. The tactile sensor may detect various pieces of information such as roughness of a contact surface, hardness of a contact material, and temperature of a contact point.

Various touch gestures of the user may include a tap, a touch and hold, a double tap, a drag, a fanning, a flick, a drag and drop, a swipe, etc.

The notification module 1730 may generate a signal to notify an event occurrence of the electronic device 1000.

Figure 5:
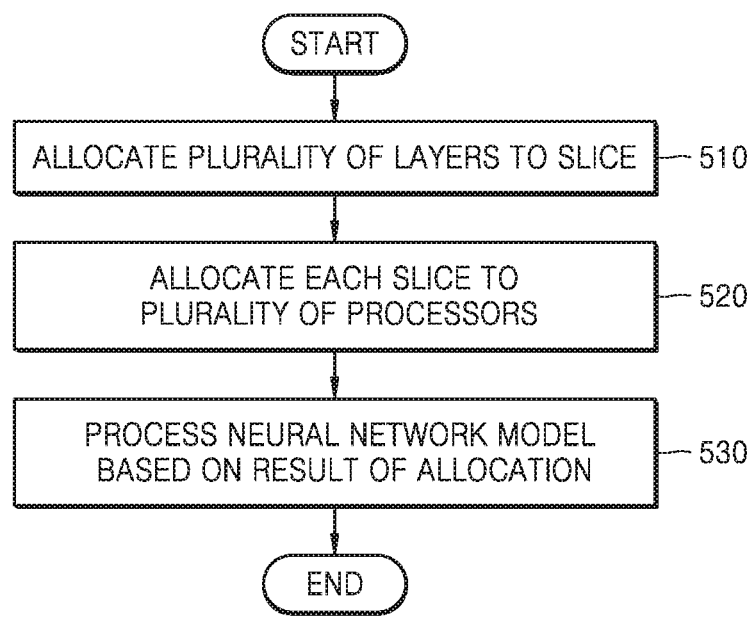
FIG. 5 is a flowchart of a method of processing a neural network model by using a plurality of processors according to an embodiment.

FIG. 5 is a flowchart of a method of processing a neural network model by using a plurality of processors according to an embodiment.

Referring to FIG. 5, in operation 510, the electronic device 1000 may allocate a plurality of layers constituting the neural network model 110 to at least one slice. The electronic device 1000 according to an embodiment may allocate a plurality of layers to at least one slice by determining whether each layer is a slice point.

For example, when a first layer is determined as a slice point, a new first slice may be created, and the first layer may be assigned to the first slice instead of a previous slice. The previous slice may indicate a slice in which at least one layer is already allocated before it is determined whether the first layer is a slice point. On the other hand, when the first layer is not determined as the slice point, the first layer may be allocated to the previous slice.

According to an embodiment, after the first layer is assigned to the first slice, when a second layer is determined as a slice point, a second slice may be newly created, and the second layer may be assigned to the second slice. On the other hand, when the second layer is not determined as the slice point, the second layer may be allocated to the first slice.

In operation 520, the electronic device 1000 may allocate a plurality of layers constituting the neural network model 110 to at least one slice, and then assign each slice to a plurality of processors. The plurality of processors according to an embodiment may process the neural network model 110 by processing at least one layer included in a slice allocated to each processor.

According to an embodiment, the electronic device 1000 may allocate each slice to the plurality of processors based on a processing time elapsed for each processor to process a slice. The processing time according to an embodiment may include the time elapsed for each processor to process a slice, and also the switching time elapsed to receive data from another processor to process a slice.

In operation 530, the electronic device 1000 may process the neural network model 110 by using a plurality of processors based on a result of the allocation in operation 520.

According to an embodiment, as processors to process respective slices are allocated, a plurality of slices arranged in parallel in the neural network model 110 may be simultaneously processed by a plurality of processors. Therefore, according to an embodiment, layers of the neural network model 110 are aligned in a line according to a topological sorting method, and thus the layers of the neural network model 110 may be processed faster than the case of sequentially processing the layers.

Figure 6:
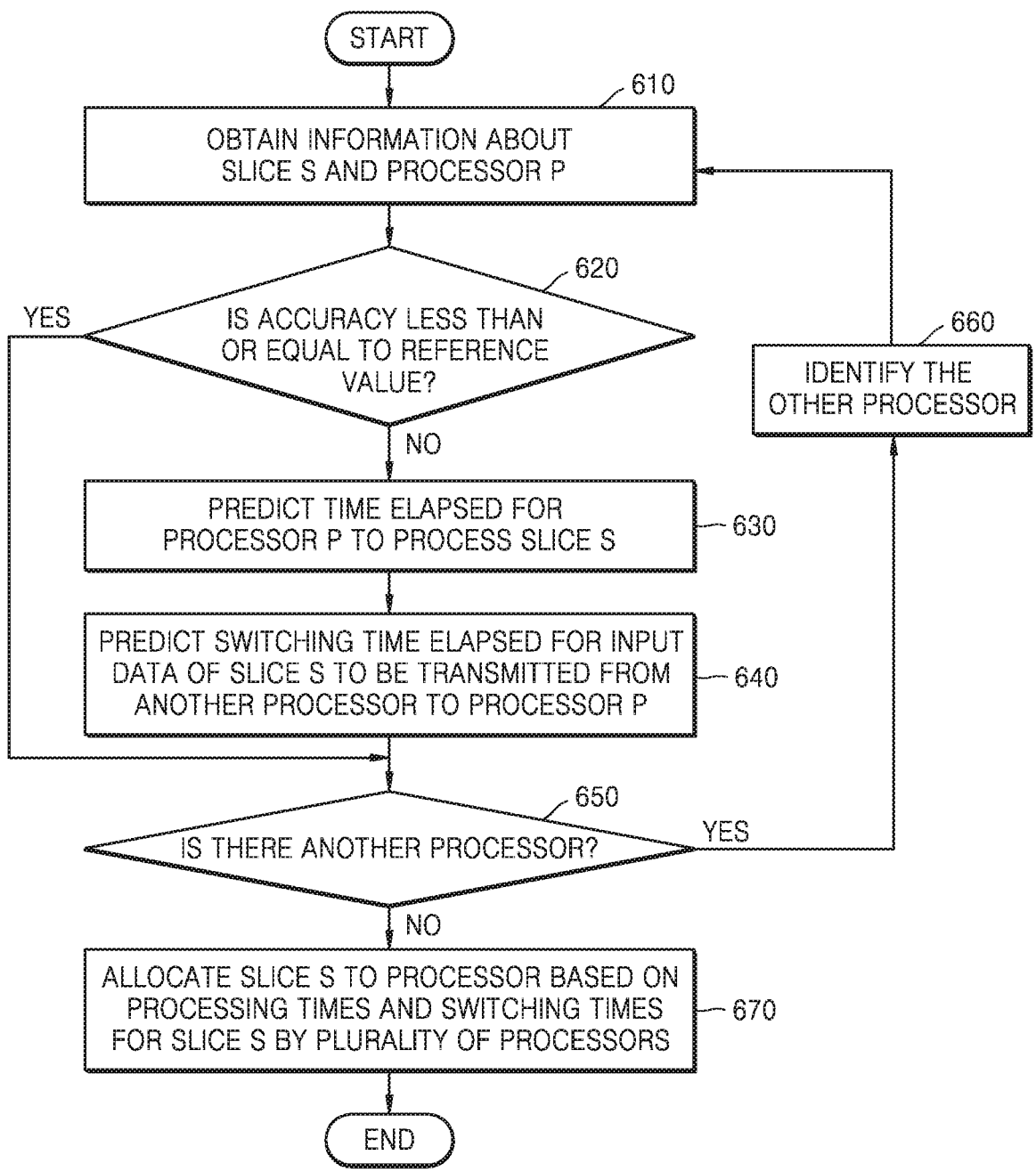
FIG. 6 is a flowchart of a method of allocating slices to a plurality of processors according to an embodiment.

FIG. 6 is a flowchart of a method of allocating slices to a plurality of processors according to an embodiment.

Referring to FIG. 6, in operation 610, the electronic device 1000 may obtain information about a slice S and a processor P.

In an embodiment, the slice S and processor P may represent one slice S of at least one slice and one processor P from among a plurality of processors, respectively. According to an embodiment, in operation 610, a processor capable of processing layers included in the slice S from among the plurality of processors included in the electronic device 100 may be determined as the processor P.

For example, information about the slice S may include information about tasks of at least one layer included in the slice S. In addition, information about processor P may include information about the performance of the processor P, such as information about tasks that may be performed by the processor P, information about times elapsed for the processor P to process tasks, and information about a switching time elapsed to transmit data between different processors. In addition to the above-described examples, the information about the slice S and the processor P may include various information that may be used to predict the processing time and the accuracy of a result of processing the slice S through the processor P.

In operation 620, when the slice S is processed by the processor P based on the information obtained in operation 610, the electronic device 1000 may predict the accuracy of a result of processing the slice S and determine whether a predicted accuracy is less than or equal to a reference value.

According to an embodiment, when the predicted accuracy is less than or equal to the reference value, in operation 650, it may be determined whether there is a processor other than the processor P. The other processor may be a processor capable of processing the slice S from among a plurality of processors of the electronic device 1000 that are not yet determined whether to be allocated to the slice S.

According to an embodiment, in operation 660, the electronic device 1000 may identify another processor capable of processing the slice S. The electronic device 1000 may repeat the operations 610 to 640 for the identified processor.

In operation 630, the electronic device 1000 may predict a time elapsed for processing a task of the slice S through the processor P based on the information obtained in operation 610. For example, the electronic device 1000 may determine the processing time of the processor P for each task type and, based on the determined processing time, the electronic device 1000 may determine the processing time of the processor P for a task of at least one layer included in the slice S. In addition to the above-described examples, the processing time of the processor P for the slice S may be predicted in various ways.

Also, in operation 640, the electronic device 1000 may estimate a switching time elapsed for input data of the slice S to be transmitted to the processor P from another processor, based on the information obtained in operation 610.

For example, the input data of the slice S may be transmitted to the processor P by a processor that processes a previous slice from which the input data is output. The previous slice according to an embodiment may indicate a slice that outputs data to be input to the slice S. Also, the switching time may indicate a time elapsed for the input data of the slice S to be transmitted to the processor P from the processor processing the previous slice. Meanwhile, when the processor processing the previous slice is the same as the processor P, the switching time may be determined as zero.

According to an embodiment, the switching time may be estimated based on a time elapsed for data to be transmitted between different processors of the electronic device 1000.

In operation 650, the electronic device 1000 may determine whether there is another processor from among processors of the electronic device 1000 for which at least one of accuracy, processing time, and switching time for the slice S is not determined in operations 620 to 640. When there is another processor, the electronic device 1000 may repeat the operations 610 to 640 for the other processor identified in operation 660.

Also, for the slice S, when there is no other processor for which at least one of accuracy, processing time, and switching time for the slice S is not determined in operations 620 through 640, the electronic device 1000 may allocate the slice S to one of a plurality of processors in operation 670.

According to an embodiment, a processor to process the slice S may be determined based on a processing time and a switching time of each processor for the slice S. For example, a processor corresponding to the smallest sum of a processing time and a switching time may be determined as the processor to process the slice S.

According to an embodiment, a processor corresponding to an accuracy equal to or less than a reference value may not be selected as a processor to process the slice S in operation 670. Therefore, even when a processing time or a switch time is short, a processor with low accuracy for a processing result may not be allocated as a processor to process the slice S.

According to an embodiment of the disclosure, after a processor is allocated to the slice S, the operations 610 to 670 may be repeatedly performed on slices other than the slice S to which no processor is allocated.

Figure 7:
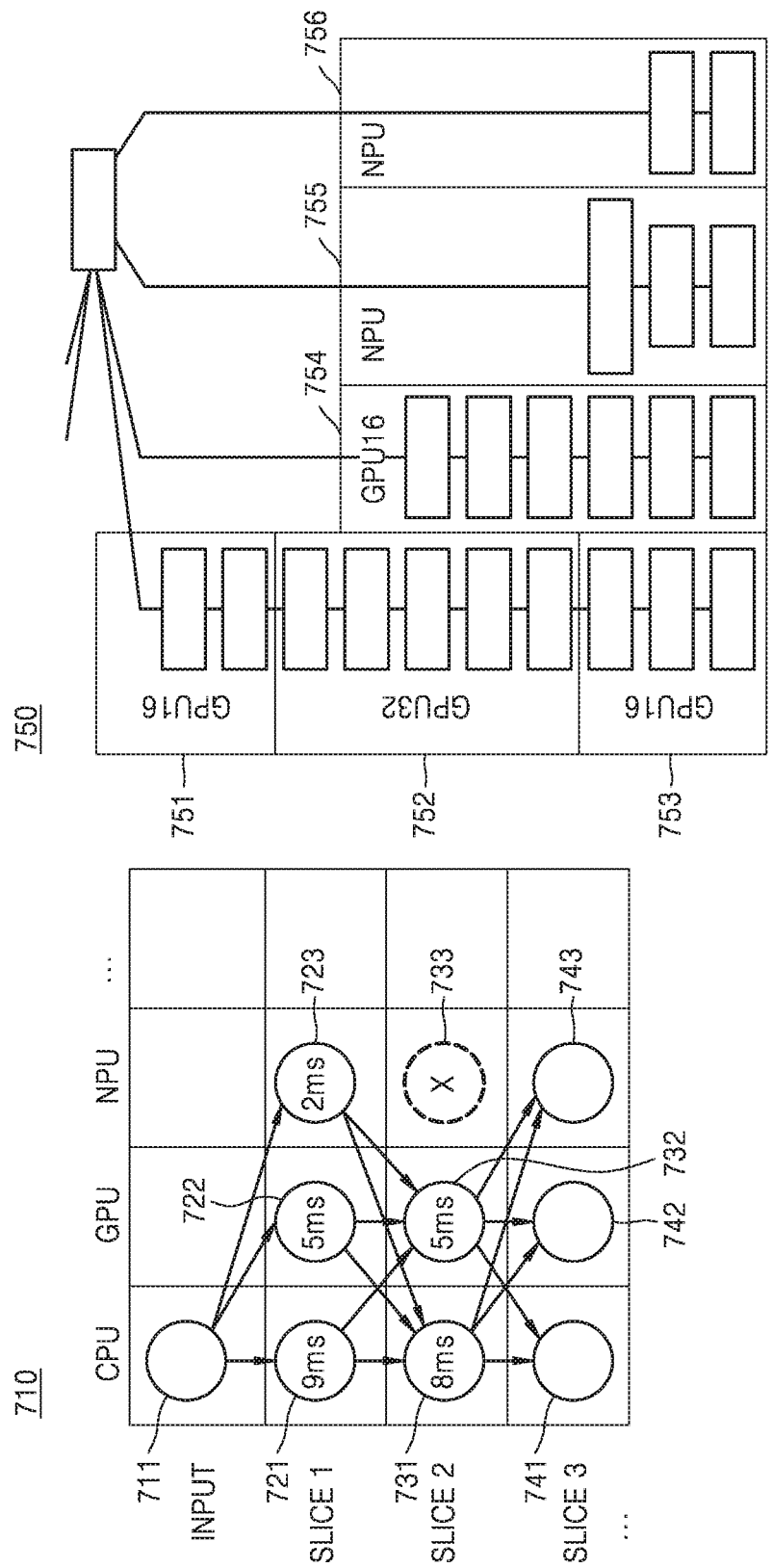
FIG. 7 is a diagram showing an example of allocating a processor to a slice, according to an embodiment.

FIG. 7 is a diagram showing an example of allocating a processor to a slice, according to an embodiment.

Referring to FIG. 7, the reference numeral 710 shows an example of a graph for allocating a processor to a slice according to a processing time and a switching time. In the graph 710, a node denote a time elapsed for processing a task of a slice, and an arrow denotes a time elapsed to switch data from a previous node to a current node.

According to an embodiment, unlike the method shown in FIG. 6 in which processors are sequentially allocated to slices, a processor for processing a slice may be determined based on a path corresponding to the smallest sum of processing times at respective nodes. The processing time according to an embodiment may include a switching time as well as a time elapsed for a processor to process a slice at each node.

For example, slices arranged in series in the neural network model 110 from among at least one slice may be allocated to the plurality of processors based on a path corresponding to the smallest sum of processing times from among a plurality of paths generates as a plurality of nodes 711, 721, 722, 723, 731, 732, 733, 741, 742, and 743 indicating combinations of different slices and different processors are connected according to an order the slices are arranged.

Input data 711 input to a slice 1 may be processed by a CPU, which is a basic processor. According to the direction of the arrow, the input data 711 may be switched to one of processors, such as a CPU, a GPU, and an NPU. As the input data 711 is switched to any one processor, the input data 711 may be input to a layer included in the slice 1 and processed by one of nodes 721, 722, and 723.

According to an embodiment, the NPU may be excluded in the operation for allocating a processor for a slice 2 as the accuracy of a result of processing the slice 2 by the NPU is less than or equal to a reference value or the slice 2 includes a layer unable to be processed by the NPU.

According to an embodiment, as shown in a graph 710, a path for allocating a CPU, a GPU, and an NPU for slices 1 to 3 may be determined as one of a total of 36 paths. Processors may be respectively allocated to the slices 1 to 3 according to a path having the smallest sum of processing times and switching times of respective nodes from among the 36 paths.

The reference numeral 750 denotes a graph showing an example in which processors are allocated to slices according to an embodiment. Processors may be respectively allocated to slices 751, 752, 753, 754, 755, and 756 each including at least one layer.

A GPU 16 and a GPU 32 shown in the graph 750 represent a 16-bit GPU and a 32-bit GPU, respectively, and may be handled as different processors in one embodiment.

According to an embodiment, slices 752, 754, and 755 may be processed simultaneously in parallel as they are allocated to different processors. Therefore, according to an embodiment, some layers arranged in parallel in the neural network model 110 may be processed simultaneously in parallel by a plurality of processors, and thus processing speed may be further improved.

According to one embodiment, slices 755 and 756 to which the same processor is allocated may be processed by an NPU after layers are serially aligned so that the layers may be simultaneously processed by the NPU. For example, the layers may be aligned according to a topological sort method and then processed simultaneously by the NPU.

According to an embodiment of the disclosure, at least one slice may be allocated to a plurality of processors according to a combination of the method of the graph 710 of FIG. 7 and the method of FIG. 6.

In the neural network model 110, processors may be allocated to slices arranged in series, e.g., slices of 751, 752, and 753, based on a path corresponding to the smallest sum of processing times from among a plurality of paths generated as a plurality of nodes indicating combinations of different slices and different processors are connected according to an order the slices are arranged, as shown in FIG. 7.

Alternatively, processors may be allocated to slices arranged in parallel in the neural network model 110, e.g., slices 754, 755, and 756, based on processing times, switching times, and accuracy of processors for the slices as shown in FIG. 6.

Figure 8:
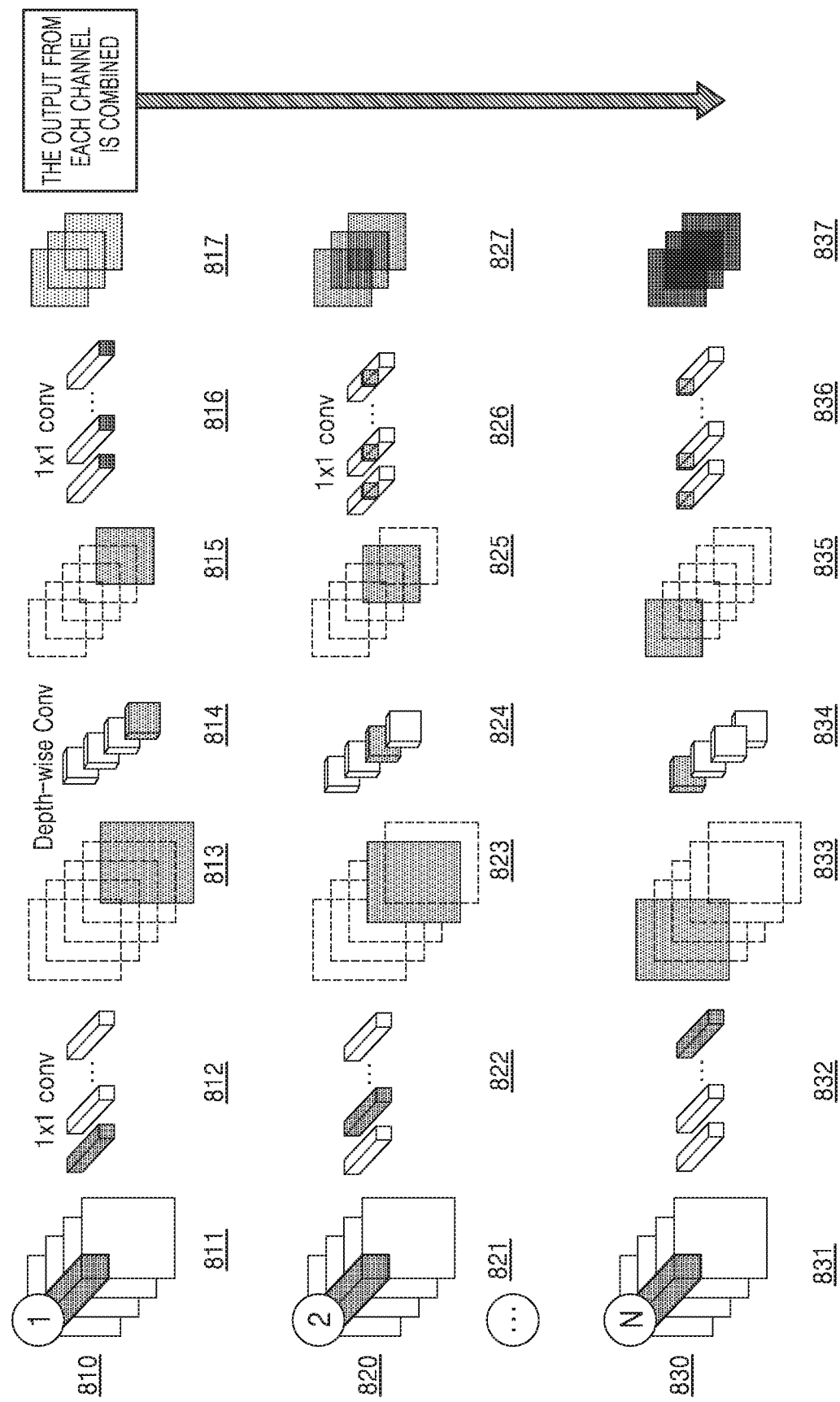
FIG. 8 is a diagram showing an example of allocating memory in a layer according to an embodiment.

FIG. 8 is a diagram showing an example of allocating memory in a layer according to an embodiment.

According to an embodiment, a convolution layer from among the layers may include a task in which an 1×1 convolution 812, depthwise convolutions (DC) 813 to 815, and an 1×1 convolution 816 are repeatedly performed from channel 1 to channel N, as shown in FIG. 8. A task for the channel 1 may be performed in operation 810, and a task for channel 2 may be performed in operation 820 after operation 810 is performed. In the same regard, the channel N may be performed in operation 830 after operations preceding the channel N are performed.

According to an embodiment, channels may correspond to a plurality of pieces of data having the same size in input data input to a layer, respectively. For example, in the first channel, first data from among the plurality of pieces of data may be processed. In the second channel, second data may be processed. Therefore, when a plurality of pieces of image data having the same size are input to a layer, a plurality of pieces of input data may be sequentially processed for channels of the same number as the number of the plurality of pieces of input data. According to an embodiment, in the convolution layer, tasks may be sequentially performed. For example, after the 1×1 convolution 812 is performed with respect to input data of all channels, the DCs 813 to 815 may be performed based on a result of performing the 1×1 convolution 812. Also, the 1×1 convolution 816 may be performed based on a result of performing the DCs 813 to 815.

According to an embodiment of the disclosure, tasks may be sequentially performed from the channel 1 to the channel N, instead of sequentially performing tasks as described above. For example, when there are 24 pieces of input data having the size of 56×56, 24 channels exist, and tasks from the channel 1 to a channel 24 may be sequentially performed for each channel.

According to an embodiment, when tasks are sequentially performed for each channel, a 294 KB size memory for storing 24 pieces of data having the size of 56×56 811, 821, and 831 input to the convolution layer may be allocated. For example, when input data is image data, a memory for storing a plurality of pieces of image data of the same size may be allocated. According to an embodiment, when tasks are sequentially performed for each channel, instead of allocating a memory for storing data for all channels, only a memory for storing data for one channel may be allocated. Therefore, when tasks are sequentially performed for each channel, a memory space allocated for data storage may be reduced as compared with the case where tasks are sequentially performed one-by-one.

In operation 810, tasks of the channel 1, that is, the 1×1 convolution 812, the DCs 813, 814, and 815, and the 1×1 convolution 816 may be sequentially performed. The 1×1 convolution 812 performed in operation 810 may be performed on the first one of 24 pieces of data having the size of 56×56 of 811 and the first one of 24 pieces of data having the size of 1×24 of 812.

According to one embodiment, for processing the 1×1 convolution 812, instead of allocating all of the 24 pieces of data of size 1×24 of 812 allocated to memory, only the first one of the 24 bits of data having the size of 1×24 of 812, which is used only in operation 810, may be allocated to a memory. The 24 pieces of data having the size of 1×24 that are used for processing the 1×1 convolution 812 may be values stored in the electronic device 1000 in advance.

In operation 820, without additional memory allocation, second data having the size of 1×24 of 822 may be stored in the same space as the memory of the data of 812 allocated in operation 810.

Therefore, according to an embodiment, when the 1×1 convolutions 812, 822, and 832 are performed on each of 24 channels, instead of allocating a 14 KB memory in which all 24 pieces of data having the size of 1×24 may be stored, only a 0.009 KB memory, in which one piece of data having the size of 1×24 may be stored, may be allocated. According to an embodiment, the memory space allocated for processing an 1×1 convolution in a previous channel may be reused for an 1×1 convolution process in a current channel. Therefore, the memory space for processing a layer in each channel may be reduced.

For memory allocation for data processed in the DCs 813, 814, 815, memory may also be allocated for data processed in the DCs 813 to 815, not for all data. The reference numeral 813 denotes data obtained by performing the 1×1 convolution 812 and may include data having the size of 56×56. Also, the reference numeral 814 denotes kernel data having the size of 3×3 used for a DC. The kernel data having the size of 3×3 may be a value stored in advance in the electronic device 1000 for processing a DC. The reference numeral 815 denotes data obtained as a result of processing a DC and may include data having the size of 56×56.

According to an embodiment, for processing the DCs 813, 814, and 815 in the channel 1, a 24.53 KB memory for storing data having the size of 56×56 of 813 (12.24 KB), kernel data having the size of 3×3 of 814 (0.03 KB), and data having the size of 56×56 of 815 (12.14 KB) may be allocated. In operation 820, in the channel 2, data of 823, 824, and 825 may be stored in the same space as the memory allocated for the data of 813, 814, and 815 in the previous operation 810 without additional memory allocation.

For memory allocation for data processed in the 1×1 convolution 816, memory may also be allocated for data processed in the 1×1 convolution 816, not for all data. In 816, 144 pieces of data having the size of 1×1 may be used in the 1×1 convolution 816. Therefore, a 0.09 KB memory capable of storing 144 pieces of data having the size of 1×1 may be allocated. In operation 820, without additional memory allocation, data of 826 may be stored in the same space as the memory allocated for the data of 816 in operation 810.

As a result of performing the 1×1 convolution 816, in 817, 24 pieces of data having the size of 56×56 may be obtained. According to an embodiment of the disclosure, a 294 KB memory in which 24 pieces of data having the size of 56×56 obtained in 817 may be stored may be allocated. In operation 820, as in 817, 24 pieces of data having the size of 56×56 may be obtained as the 1×1 convolution 826 is performed in 827. Thereafter, also in channels 3 to N, 24 pieces of data having the size of 56×56 may be obtained for each channel as a result of performing an 1×1 convolution, DCs, and an 1×1 convolution.

According to an embodiment, by combining 24 pieces of data having the size of 56×56 output from each channel, a final result for the convolution layer may be obtained.

Thus, a total of 612 KB memory space, which is the sum of the at least one piece of data used for the task 810 in the channel 1 to be processed, may be allocated. According to an embodiment, in channels 2 to N 820 to 830, since the tasks of the channels are sequentially performed, the 612 KB memory space allocated in the channel 1 may be re-used without additional memory allocation. Therefore, all the tasks of the channel 1 through the channel N 810, 820, and 830 of the convolution layer may be processed with only 612 KB memory space.

According to an embodiment, the size of a memory space used to process a layer is not limited to the above-described examples, and various sizes of memory space may be allocated and used according to the sizes of data to be processed.

Also, FIG. 8 shows an example in which input data is processed by a convolution layer. However, according to an embodiment, the disclosure is not limited thereto, and a plurality of pieces of input data may be input to various types of layers other than the convolution layer. According to an embodiment, like in the case that a memory space is allocated for the convolution layer described above, a memory space for other types of layers may each be allocated as much as a memory size needed to process tasks in a first channel from among a plurality of channels for processing tasks in the plurality of channels of the layer. In channels other than the first channel, the memory allocated for the task in the first channel may be re-used without additional memory allocation.

Figure 9:
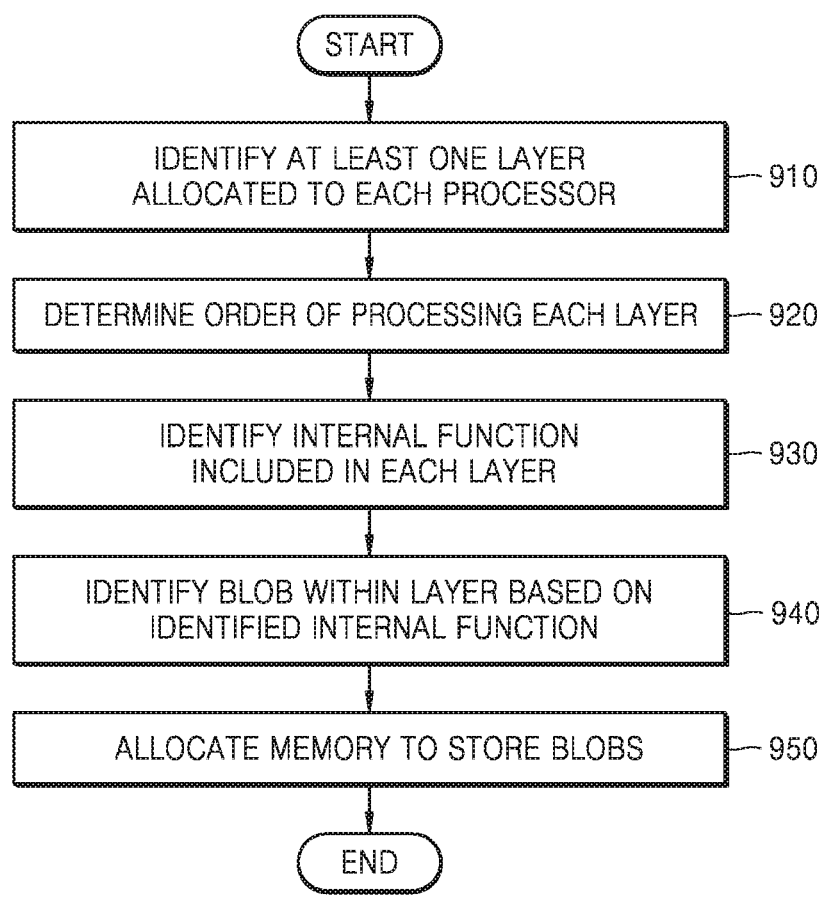
FIG. 9 is a flowchart of a method of allocating memory for I/O data of a layer according to an embodiment.

FIG. 9 is a flowchart of a method of allocating memory for I/O data of a layer according to an embodiment.

Memory according to an embodiment may be allocated to blobs respectively corresponding to I/O data of a layer. The neural network model 110 according to an embodiment may include a layer on which a task is performed and blobs respectively corresponding to data input/output to/from the layer.

According to an embodiment, not only blobs for I/O data of a layer, but also blobs for intermediate data generated by an internal function of the layer may be identified. Therefore, the electronic device 1000 may allocate memory by further taking the blobs for the intermediate data into account.

In an embodiment, memory allocation refers to an operation for allocating spaces of a memory where data is to be stored in advance during a compiling operation. During memory allocation according to an embodiment, after blobs to be allocated to the same memory space are determined, the size of each memory space may be determined based on the data size of the blobs.

Referring to FIG. 9, in operation 910, the electronic device 1000 may identify a layer allocated to each processor. According to an embodiment, the electronic device 1000 may identify at least one layer included in at least one slice allocated to a first processor from among a plurality of processors according to a method of allocating slices to a plurality of processors. The electronic device 1000 according to an embodiment may perform memory allocation according to an embodiment for each processor.

In operation 920, the electronic device 1000 may determine an order for executing at least one layer allocated to one processor. According to an embodiment, the electronic device 1000 may determine an order for processing at least one layer according to a phase alignment method. The disclosure is not limited to the examples described above, and an order for processing one layer may be determined in various ways.

In operation 930, the electronic device 1000 may identify an internal function included in each layer and, in operation 940, may identify, based on the identified internal function, a blob including data temporarily stored in the layer including the internal function. According to an embodiment, blobs input and output to each layer may be blobs already identified according to information about the structure of the neural network model 110.

For example, when two or more internal functions are included in a layer, there may be blobs for intermediate data temporarily stored between the two internal functions. In addition to the above-described examples, blobs other than blobs for data input to and/or output from a layer through the internal function of the layer may be identified in operation 940.

According to an embodiment of the disclosure, memory for storing data while a task is being performed needs to be allocated to blobs in which data is temporarily stored by an internal function of a layer, like I/O data of the layer. Therefore, the electronic device 1000 may perform memory allocation in consideration of blobs for temporary data storage in a layer as well as blobs for I/O data of the layer.

In operation 950, the electronic device 1000 may allocate a memory in which at least one of blobs for I/O data for each layer and blobs identified in operation 940 for the internal function of each layer are to be stored.

According to an embodiment, a memory for a current blob may be allocated based on whether a period for using a previous blob is terminated before data of a current blob is generated according to an order for processing each layer. For example, when the period for using the previous blob is terminated before data of the current blob is generated, the same memory as the memory allocated to the previous blob may be allocated to the current blob. The period for using a blob according to an embodiment may be determined based on a period in which data of the blob used by at least one layer. For example, the period for using a blob may refer to a period in which data of the blob is read from or written to a memory space (e.g., a buffer) storing the data as a task of each layer is performed. Also, a period in which data of a blob for determining a usage period is used by at least one layer may be determined based on the lifetime of the blob. For example, the lifetime of a blob may be a pre-set value or may be determined based on a period for executing a function of a layer in which the blob is processed. In addition In addition to the above-described examples, a period for using a blob may be determined in various ways.

For example, when at task by the first layer is completed, the electronic device 1000 may no longer use the input data of the first layer and data temporarily stored by the internal function of the first layer. Therefore, temporarily stored data and output data of a second layer operated after the first layer may use the memory space in which the input data and the data temporarily stored by the internal function of the first layer are stored.

The electronic device 1000 according to an embodiment may determine the largest data size from among data sizes of at least one blob to which the same memory is allocated as the size of the memory.

For example, it may be determined that the same memory for a blob 3 indicating temporarily stored data of the second layer and a blob 4 indicating output data of the second layer is allocated for a blob 1 indicating input data of the first layer and a blob 2 indicating temporarily stored data of the first layer. For example, a first memory may be allocated to the blob 1 and the blob 3, and a second memory may be allocated to the blob 2 and the blob 4.

When the data size of the blob 1 is 1 kb and the data size of the blob 3 is 2 kb, the first memory may be allocated to the size of 2 kb, which is the largest data size from among blobs allocated to the first memory. Also, when the data size of the blob 2 is 4 kb and the data size of the blob 4 is 5 kb, the second memory may be allocated to the size of 5 kb, which is the largest data size from among blobs allocated to the second memory.

Figure 10:
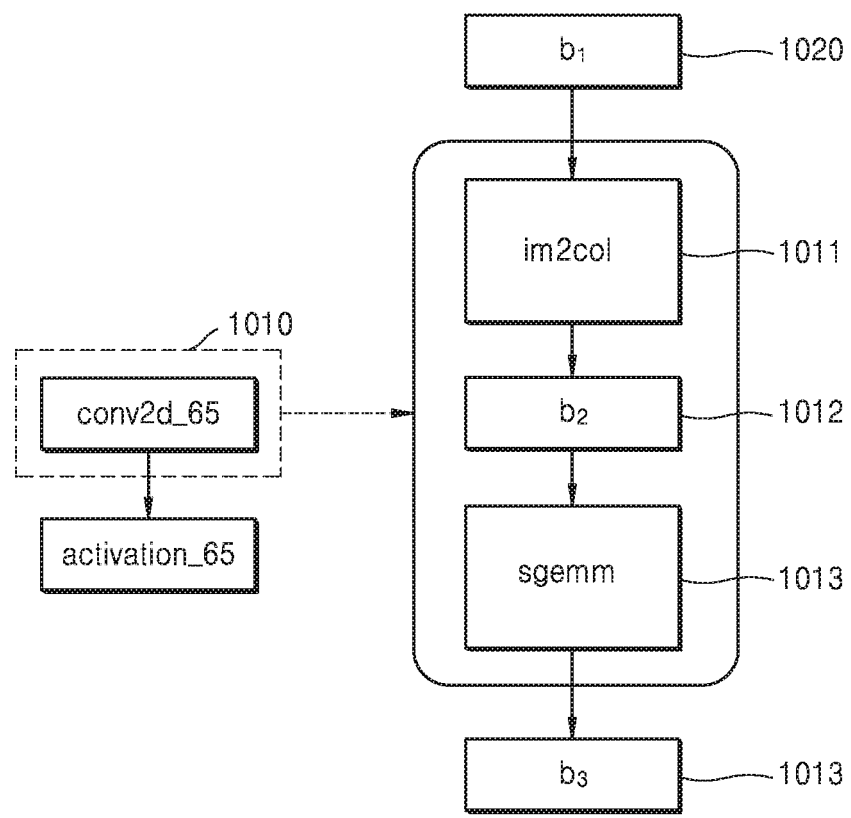
FIG. 10 is a diagram showing an example of identifying a blob inside a layer according to an embodiment.

FIG. 10 is a diagram showing an example of identifying a blob inside a layer according to an embodiment.

Referring to FIG. 10, internal functions "im2col" 1011 and "sgemm" 1013 may be identified with respect to a "conv2d_65" 1010 layer from among a plurality of layers included in the neural network model 110. In addition, a blob $b_2$ 1012 temporarily stored between the internal functions 1011 and 1013 may be identified.

A blob $b_1$ 1020 and a blob $b_3$ 1030 according to an embodiment are blobs indicating input data and output data for the "conv2d_65" 1010 layer, respectively.

Therefore, according to an embodiment, for the "conv2d_65" 1010 layer, the blob $b_1$ 1020, the blob $b_2$ 1012, and the blob $b_3$ 1030 may be identified, and memory allocation may be performed for the identified blobs.

According to an embodiment, memory allocated for each blob may be allocated based on whether a period for using a previous blob is terminated before data of a current blob is generated.

For example, the blob $b_1$ 1020 may no longer be used from a time point when processing of the "sgemm" 1013 begins after the processing of the "im2col" 1011 is completed. The period for using the blob b₁ 1020 may be terminated before data of the blob b₃ 1030 is generated. Therefore, according to an embodiment, the same memory may be allocated to the blob b₁ 1020 and the blob b₃ 1030. For example, when the "sgemm" 1013 is processed, after the blob b₁ 1020 previously stored in the same memory space to which the blob b₁ 1020 is allocated is deleted, the data of the blob b₃ 1030 may be stored therein.

Also, a memory allocated to a blob of which a usage period is terminated before the blob b₂ 1012 is generated from among blobs preceding the blob b₂ 1020 may be reallocated to the blob b₂ 1012.

Figure 11:
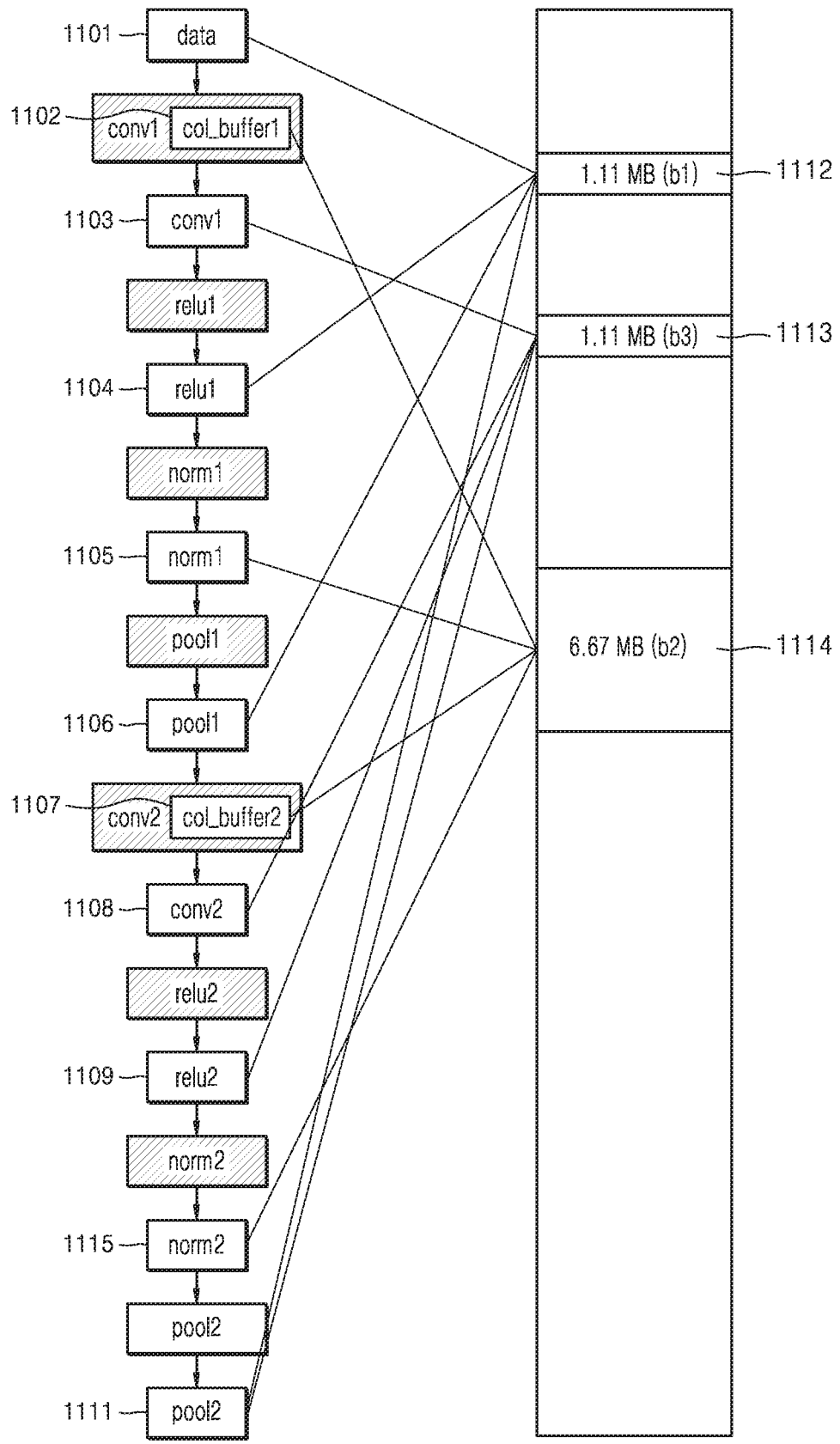
FIG. 11 is a diagram showing an example of allocating memory to a blob of a neural network model including a blob inside a layer according to an embodiment.

FIG. 11 is a diagram showing an example of allocating memory to a blob of the neural network model 110 including a blob inside a layer according to an embodiment.

According to an embodiment, blobs 1101, 1103, 1104, 1105, 1106, 1108, 1109, 1111, and 1115 representing I/O data of a plurality of layers may be identified. Also, blobs 1102 and 1107 representing data that may be temporarily stored due to internal functions of respective layers may be identified.

In FIG. 11, hatched blocks denotes layers on which tasks may be performed, and blocks that are not hatched denote blobs indicating data.

According to an embodiment, a data blob 1101, a col_buffer1 blob 1102, and a conv1 blob 1103 may be allocated to different memories as period of using them overlap one another. For example, the data blob 1101, the col_buffer1 blob 1102, and the conv1 blob 1103 may be allocated to a b1 memory 1112, a b2 memory 1114, and a b3 memory 1113, respectively.

Also, the data blob 1101 and col_buffer1 blob 1102 may be used in the conv1 layer and may be no longer used after a relu1 layer processed after the conv1 layer. Therefore, the periods for using the data blob 1101 and the col_buffer1 blob 1102 may be terminated before a relu1 blob 1104 is generated. The relu1 blob 1104 may be allocated to the b1 memory 1112 or the b2 memory 1114, which is the same memory as the memory for the data blob 1101 or the col_buffer1 blob 1102. In an embodiment, it is assumed that the relu1 blob 1104 is allocated to the b1 memory 1112.

Also, a norm1 blob 1105 may be allocated to a memory in which a blob corresponding to a usage period terminated before the norm1 blob 1105 is generated is stored. For example, the norm1 blob 1105 may be allocated to the b2 memory 1114 or the b3 memory 1113. In an embodiment, it is assumed that the norm1 blob 1105 is allocated to the b2 memory 1114.

Also, a pool1 blob 1106 may be allocated to the b1 memory 1112 or the b2 memory 1114, which is a memory in which a blob of which a usage period is terminated before the pool1 blob 1106 is generated. In an embodiment, it is assumed that the pool1 blob 1106 is allocated to the b1 memory 1112.

Also, a col_buffer2 blob 1107 may be allocated to the b2 memory 1114 or the b3 memory 1113, which is a memory in which a blob of which a usage period is terminated before the col_buffer2 blob 1107 is generated. In an embodiment, it is assumed that the col_buffer2 blob 1107 is allocated to the b2 memory 1114.

Also, a conv2 blob 1108 may be allocated to the b1 memory 1112 or the b3 memory 1113, which is a memory in which a blob of which a usage period is terminated before the conv2 blob 1108 is generated.

Also, a relu2 blob 1109 may be allocated to the b1 memory 1112 or the b2 memory 1114, which is a memory in which a blob of which a usage period is terminated before the relu2 blob 1109 is generated. In an embodiment, it is assumed that the relu2 blob 1109 is allocated to the b1 memory 1112.

Also, a norm2 blob 1115 may be allocated to the b2 memory 1114 or the b3 memory 1113, which is a memory in which a blob of which a usage period is terminated before the norm2 blob 1115 is generated. In an embodiment, it is assumed that the norm2 blob 1115 is allocated to the b2 memory 1114.

Also, a pool2 blob 1111 may be allocated to the b1 memory 1112 or the b2 memory 1114, which is a memory in which a blob of which a usage period is terminated before the pool2 blob 1111 is generated. In an embodiment, it is assumed that the pool2 blob 1110 is allocated to the b1 memory 1112.

According to an embodiment, after each blob is allocated to the b1 memory 1112, the b2 memory 1114, or the b3 memory 1113 according to the above-described method, the sizes of the b1 memory 1112, the b2 memory 1114, and the b3 memory 1113 may be determined based on the largest value from among the data sizes of the blobs allocated to the respective memories.

According to an embodiment, blobs may have data size values as shown in Table 2 below.

TABLE 2

| Blob Name | Type | Data Size (MB) | Allocated Memory |
| --- | --- | --- | --- |
| Data | I/O Data | 0.59 | b1 |
| col_buffer1 | Internal Data | 4.19 | b2 |
| conv1 | I/O Data | 1.11 | b3 |
| relu1 | I/O Data | 1.11 | b1 |
| norm1 | I/O Data | 1.11 | b2 |
| pool1 | I/O Data | 0.27 | b1 |
| col_buffer2 | Internal Data | 6.67 | b2 |
| conv2 | I/O Data | 0.71 | b3 |
| relu2 | I/O Data | 0.71 | b1 |
| norm2 | I/O Data | 0.71 | b2 |
| pool2 | I/O Data | 0.17 | b1 |

According to an embodiment, the size of the b1 memory 1112 may be determined based on the largest value (that is, 1.11 MB) from among the data sizes of the data blob 1101, the relu1 blob 1104, the pool1 blob 1106, the relu2 blob 1109, and the pool2 blob 1111 allocated to the b1 memory 1112.

Also, the size of the b2 memory 1114 may be determined based on the largest value (that is, 6.67 MB) from among the data sizes of the col_buffer1 blob 1102, the norm1 blob 1105, the col_buffer2 blob 1107, and the norm2 blob 1110 allocated to the b2 memory 1114.

Also, the size of the b3 memory 1113 may be determined based on the largest value (that is, 1.11 MB) of the data sizes of the colv1 blob 1103 and the conv2 blob 1108 allocated to the b3 memory 1113.

Therefore, according to an embodiment, a memory space of 8.89 MB, which is the sum of the sizes of the b1 memory 1112, the b2 memory 1114, and the b3 memory 1113, may be used to store the blobs shown in FIG. 11.

When memory is allocated only for blobs for I/O data without blobs for internal data, memory for storing blobs for internal data needs be reallocated, and thus memory allocation space may increase.

However, according to an embodiment, as memory is allocated in consideration of not only blobs for I/O data, but also blobs for internal data generated by an internal function of a layer. Therefore, a smaller memory space may be allocated.

Figure 12:
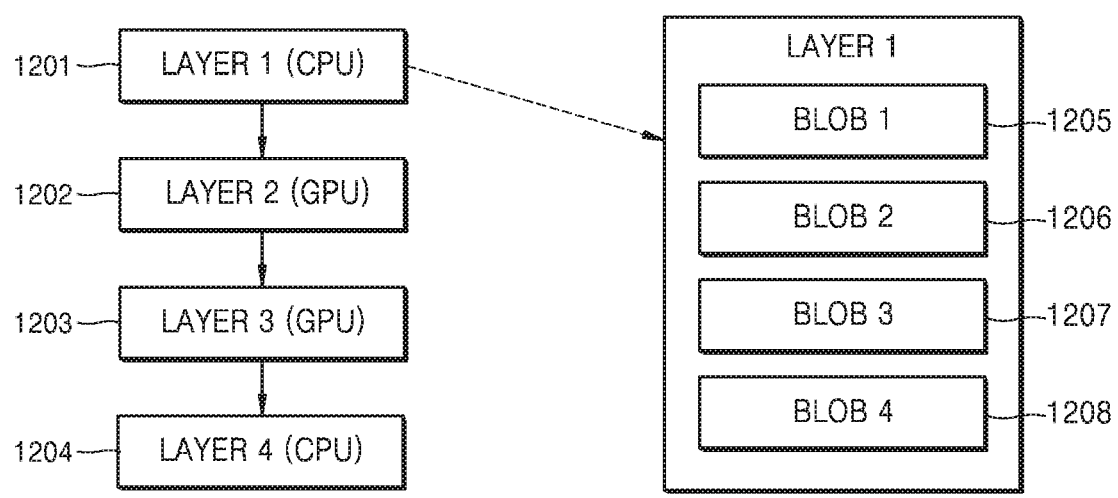
FIG. 12 is a diagram showing an example in which a neural network model is processed by a plurality of processors according to an embodiment.

FIG. 12 is a diagram showing an example in which a neural network model is processed by a plurality of processors according to an embodiment.

According to the method for allocating layers to a plurality of processors according to an embodiment, layers 1 to 4 1201, 1202, 1203, and 1204 may be processed by a CPU, a GPU, a GPU, and a CPU, respectively.

Memory may be allocated to blobs for I/O data and internal data of a layer 1 1201 and a layer 4 1204 processed by the CPU according to a memory allocation method according to an embodiment. For example, at least one of memories allocated to the blobs of the layer 1 1201 (e.g., blobs including I/O data or internal data of the layer 1 1201) may be reallocated to blobs of the layer 4 1204.

According to an embodiment, when blobs for a plurality of pieces of internal data exist in the same layer, the same memory may be allocated to the blob.

According to an embodiment, blobs 1 to 4 1205, 1206, 1207, and 1208 may exist in the layer 1 1201 for different internal data generated by different internal functions in the layer 1 1201. For example, output data by internal functions 1 to 4 arranged in series may be indicated by the blobs 1 to 4 1205, 1206, 1207, and 1208, respectively. Also, data of a blob 4 1208 may be used as input data of an internal function 5.

According to an embodiment, since the task of an internal function 3 of a blob 3 1207 may be performed after the task of an internal function 1 of a blob 1 1205 is completed, a period for using the blob 1 1205 may be terminated before the blob 3 1207 is generated. Therefore, the memory allocated to the blob 1 1205 may be reallocated to the blob 3 1207.

Also, since the task of an internal function 4 of a blob 4 1206 may be performed after the task of an internal function 4 of a blob 4 1208 is completed, a period for using the blob 2 1206 may be terminated before the blob 4 1208 is generated. Therefore, the memory allocated to the blob 2 1206 may be reallocated to the blob 4 1208.

According to an embodiment, a neural network model may be processed more quickly and accurately by using a plurality of processors.

One or more embodiments may be implemented by a computer-readable recording medium including computer-executable instructions such as a program module executed by a computer. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. Communication media typically includes computer readable instructions, data structures, or program modules and includes any information delivery media.

Also, in this specification, a "unit" may be a hardware component, such as a processor or a circuit, and/or a software component executed by a hardware component like a processor.

It will be understood by one of ordinary skill in the art that various changes in form and details may be made therein without departing from the spirit and scope of the disclosure as defined by the following claims. It is therefore to be understood that the above-described embodiments are merely illustrative in all aspects and not restrictive. For example, each component described as a single entity may be distributed and implemented, and components described as being distributed may also be implemented in a combined form.

Therefore, the scope of the disclosure is defined not by the detailed description but by the appended claims, and all differences within the scope will be construed as being included in the disclosure.

What is claimed is:

1. A method of processing a neural network model using a plurality of processors, the method comprising:
    allocating each layer from among a plurality of layers included in the neural network model to at least one slice of a plurality of slices;
    allocating the at least one slice to a processor from among the plurality of processors based on respective processing times of the plurality of processors for processing the at least one slice; and
    processing the neural network model by using the plurality of processors based on a result of the allocating,
    wherein the processing times comprise (i) a computation time to process the at least one slice and (ii) a switching time elapsed to receive data required to process the at least one slice for each processor from among the plurality of processors,
    wherein the plurality of slices include a previous slice processed by a first processor from the plurality of processors and a current slice from the plurality of slices processed by a second processor from the plurality of processors,
    wherein the previous slice is processed before the current slice, and
    wherein the switching time includes a time to transfer data regarding a result of processing the previous slice from the first processor processing the previous slice to the second processor from among the plurality of processors for processing the current slice.

2. The method of claim 1, wherein each layer from among the plurality of layers is allocated to the at least one slice by determining at least one layer of the plurality of layers as a slice point, and
    wherein the slice point is determined based on at least one of whether each layer of the plurality of layers is a branching point of the plurality of layers, whether each layer of the plurality of layers is a point at which the plurality of layers is combined, whether each layer of the plurality of layers comprises a task able to be processed by a same processor, and whether each layer of the plurality of layers comprises a task that needs high accuracy.

3. The method of claim 1, wherein the at least one slice is allocated to the processor from among the plurality of processors based on a path corresponding to a smallest sum of the processing times from among a plurality of paths generated as a plurality of nodes indicating combinations of different slices from among the at least one slice and different processors from among the plurality of processors are connected according to an order in which the at least one slice is arranged.

4. The method of claim 1, wherein a plurality of pieces of input data to be input to a layer of the plurality of layers are sequentially processed for each channel from among a plurality of channels of a same number as a number of the plurality of pieces of input data, and wherein for the plurality of channels of the layer, as much memory size as needed to process a task in a first channel from among the plurality of channels is allocated.

5. The method of claim 1, further comprising:
identifying at least one layer included in the at least one slice allocated to a processor of the plurality of processors;
identifying at least one blob indicating at least one of data input to the at least one layer, data output from the at least one layer, and data temporarily stored in the at least one layer; and
allocating memory to store data of the at least one blob.

6. The method of claim 5, wherein the allocating comprises:
determining an order for processing the at least one layer; and
allocating memory for a current blob by determining whether a period for using a previous blob is terminated before data of the current blob is generated based on the order.

7. The method of claim 5, wherein the allocating comprises determining a size of the memory based on a largest data size from among data sizes of the at least one blob to which a same memory is allocated.

8. An electronic device for processing a neural network model, the electronic device comprising:
a memory configured to store the neural network model;
at least one processor configured to allocate each layer from among a plurality of layers included in the neural network model to at least one slice from a plurality of slices, allocate the at least one slice to a processor from among a plurality of processors based on respective processing times of the plurality of processors for processing the at least one slice, process the neural network model based on a result of the allocation; and
output circuitry configured to output a result of processing the neural network model,
wherein the processing times comprises (i) a computation time to process the at least one slice (ii) a switching time elapsed to receive data required to process the at least one slice for each processor from among the plurality of processors,
wherein the plurality of slices include a previous slice processed by a first processor from the plurality of processors and a current slice from the plurality of slices processed by a second processor from the plurality of processors,
wherein the previous slice is processed before the current slice, and
wherein the switching time includes a time to transfer data regarding a result of processing the previous slice from the first processor processing the previous slice to the second processor for processing the current slice.

9. The electronic device of claim 8, wherein each layer from among the plurality of layers is allocated to the at least one slice by determining at least one layer of the plurality of layers as a slice point, and
wherein the slice point is determined based on at least one of whether each layer of the plurality of layers is a branching point of the plurality of layers, whether each layer of the plurality of layers is a point at which the plurality of layers are combined, whether each layer of the plurality of layers comprises a task able to be processed by a same processor, and whether each layer of the plurality of layers comprises a task that needs high accuracy.

10. The electronic device of claim 8, wherein the at least one slice is allocated to the processor from among the plurality of processors based on a path corresponding to a smallest sum of the processing times from among a plurality of paths generated as a plurality of nodes indicating combinations of different slices from among the at least one slice and different processors from among the plurality of processors are connected according to an order in which the at least one slice is arranged.

11. The electronic device of claim 8, wherein a plurality of pieces of input data to be input to a layer of the plurality of layers are sequentially processed for each channel from among a plurality of channels of a same number as a number of the plurality of pieces of input data, and
wherein for the plurality of channels of the layer, as much memory size as needed to process a task in a first channel from among the plurality of channels is allocated.

12. The electronic device of claim 8, wherein the at least one processor identify at least one layer included in the at least one slice allocated to a processor of the plurality of processors,
identify at least one blob indicating at least one of data input to the at least one layer, data output from the at least one layer, and data temporarily stored in the at least one layer, and
allocate memory to store data of the at least one blob.

13. The electronic device of claim 12, wherein the at least one processor determine an order for processing the at least one layer, and allocate memory for a current blob by determining whether a period for using a previous blob is terminated before data of the current blob is generated based on the order.

14. The electronic device of claim 12, wherein the at least one processor determine a size of the memory to store data of the at least one blob based on a largest data size from among data sizes of the at least one blob to which a same memory is allocated.

15. A non-transitory computer-readable recording medium having instructions stored therein, which when executed by a processor cause the processor to execute a method of processing a neural network model using a plurality of processors, the method comprising:
allocating each layer from among a plurality of layers included in the neural network model to at least one slice from a plurality of slices;
allocating the at least one slice to a processor from among the plurality of processors based on respective processing times of the plurality of processors for processing the at least one slice; and
processing the neural network model by using the plurality of processors based on a result of the allocating,
wherein the processing times comprise (i) a computation time to process the at least one slice and (ii) a switching time elapsed to receive data required to process the at least one slice for each processor from among the plurality of processors,
wherein the plurality of slices include a previous slice processed by a first processor from the plurality of processors and a current slice from the plurality of slices processed by a second processor from the plurality of processors,
wherein the previous slice is processed before the current slice, and wherein the switching time includes a time to transfer data regarding a result of processing the previous slice from the first processor processing the previous slice to the second processor for processing the current slice.

16. The method according to claim 1, wherein the switching time further includes a time to convert the transferred data to a format of the processor for processing the current slice.

17. The method according to claim 1, wherein the allocating each layer from among the plurality of layers to the processor from among the plurality of processors further comprises:
predicting an accuracy of a result of a processor from the among the plurality of processors processing the at least one slice based on a respective processing time of the processor; and
allocating the at least one slice to the processor based on a determination that the accuracy of the predicted result is greater than a reference value.

18. The electronic device according to claim 8, wherein the switching time further includes a time to convert the transferred data to a format of the processor for processing the current slice.

19. The electronic device according to claim 8, wherein the at least one processor further configured to:
predict an accuracy of a result of a processor from the among the plurality of processors processing the at least one slice based on a respective processing time of the processor, and
allocate the at least one slice to the processor based on a determination that the accuracy of the predicted result is greater than a reference value.

20. The non-transitory computer-readable medium according to claim 15, wherein the switching time further includes a time to convert the transferred data to a format of the processor for processing the current slice.

21. The method according to claim 1, wherein each slice comprises two or more layers.

22. The method according to claim 21, wherein the result of the processing the previous slice comprises a processing result of a last layer among the two or more layers included in the previous slice.

* * * * *